United States Patent
Wang et al.

(10) Patent No.: US 7,700,199 B2
(45) Date of Patent: Apr. 20, 2010

(54) SEAMLESS MASTER AND METHOD OF MAKING SAME

(75) Inventors: San Zhuang Wang, Torrance, CA (US); Gajendra Savant, Rolling Hills Estates, CA (US); Edward M. Kaiser, Redondo Beach, CA (US); Kang Lee, Woodland Hills, CA (US)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 11/879,327

(22) Filed: Jul. 16, 2007

(65) Prior Publication Data

US 2007/0261810 A1    Nov. 15, 2007

Related U.S. Application Data

(62) Division of application No. 09/656,681, filed on Sep. 7, 2000, now Pat. No. 6,675,863.

(51) Int. Cl.
*B32B 15/00* (2006.01)
(52) U.S. Cl. .............. 428/687; 428/615; 428/680; 428/34.1; 428/215; 428/220; 428/332
(58) Field of Classification Search ............ 428/615, 428/680, 687, 34.1, 215, 220, 332; 427/278, 427/162; 369/272, 283, 286
See application file for complete search history.

(56) References Cited

U.S. PATENT DOCUMENTS

| | | | | |
|---|---|---|---|---|
| 3,763,030 A | * | 10/1973 | Zimmer | 204/281 |
| 5,151,917 A | | 9/1992 | Perilloux et al. | |
| 5,365,354 A | | 11/1994 | Jannsen et al. | |
| 5,534,386 A | | 7/1996 | Petersen et al. | |
| 5,609,939 A | | 3/1997 | Petersen et al. | |
| 5,874,132 A | | 2/1999 | Jung | |
| 6,017,657 A | * | 1/2000 | Mentz et al. | 430/1 |

FOREIGN PATENT DOCUMENTS

| | | | |
|---|---|---|---|
| GB | 1 365 132 | * | 8/1974 |
| WO | WO 91/01225 | * | 2/1991 |
| WO | WO 99/58319 | * | 11/1999 |

OTHER PUBLICATIONS

Brochure—*Light Shaping Diffusers Technical Data Sheet*, Jul. 1, 1998, Physical Optics Corporation.

* cited by examiner

*Primary Examiner*—Gwendolyn Blackwell
(74) *Attorney, Agent, or Firm*—Morgan Lewis & Bockius LLP

(57) ABSTRACT

Hollow, cylindrical, seamless metal master for producing seamless diffuser sheets of preselected length and width. Additional aspects of the invention include a hollow cylindrical seamless invertable elastomeric master and method of making the same and an apparatus and process for effecting variable diffuser recording in photosensitive medium.

7 Claims, 11 Drawing Sheets

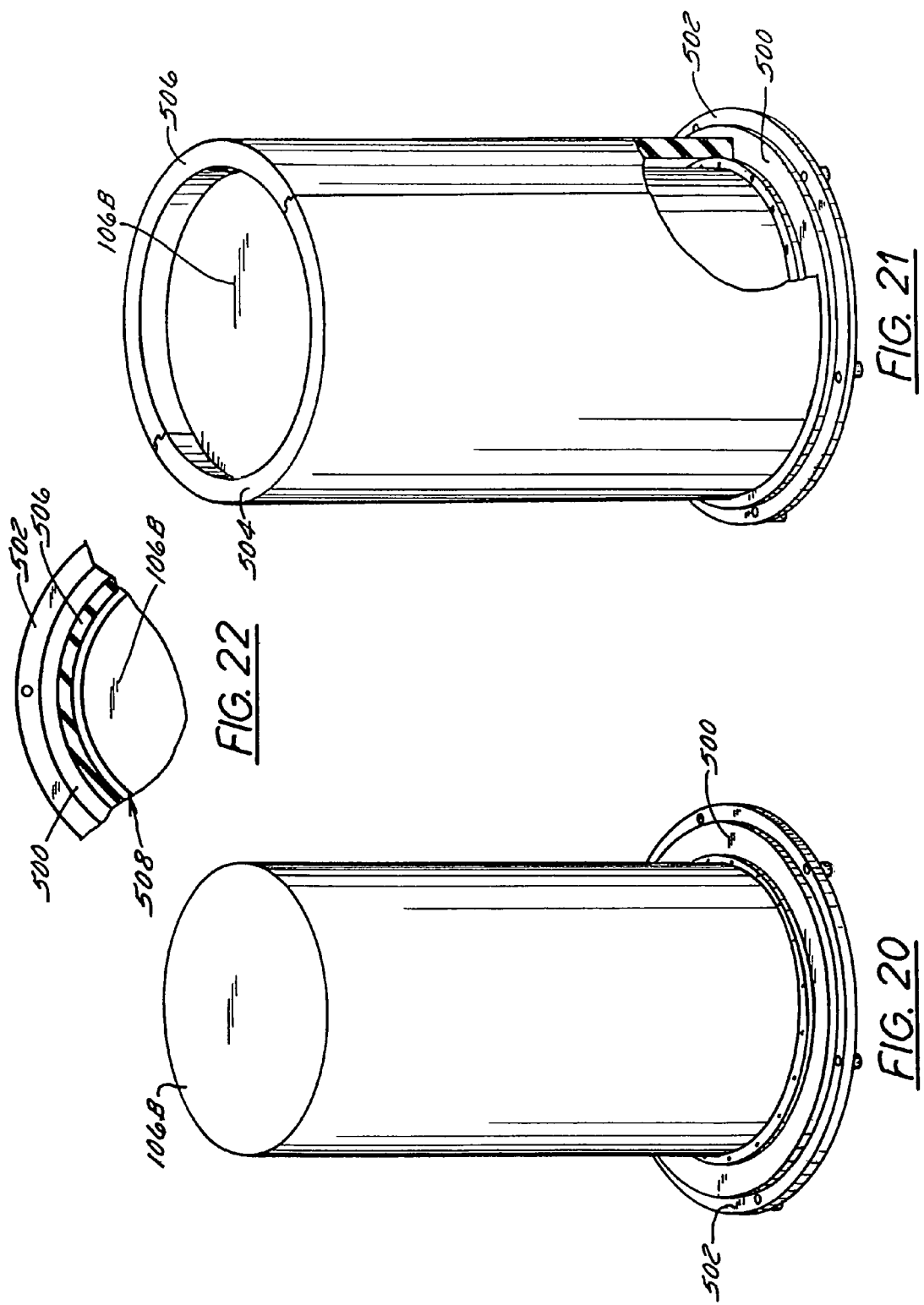

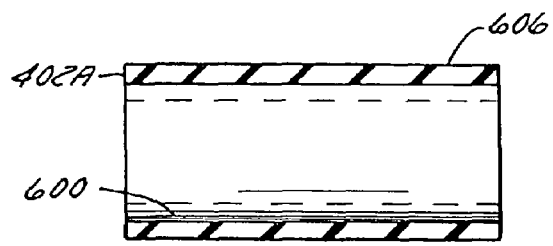
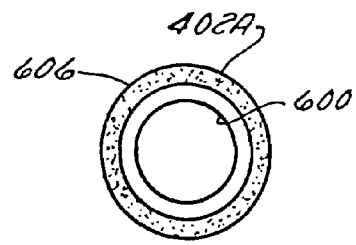
FIG. 23  FIG. 24
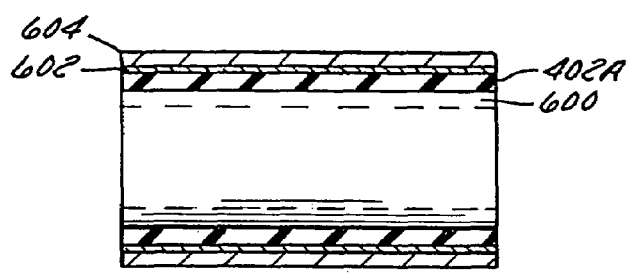
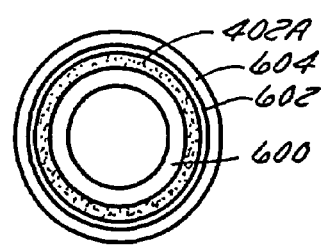
FIG. 25  FIG. 26
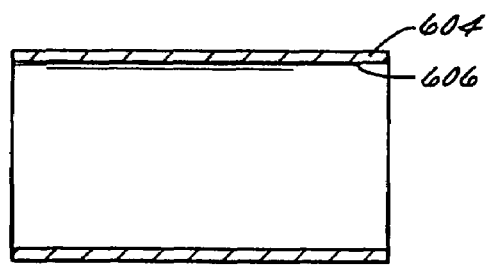
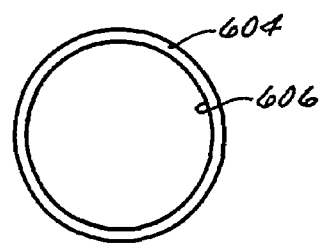
FIG. 27  FIG. 28

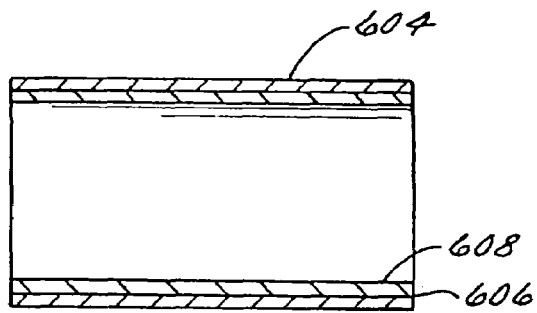 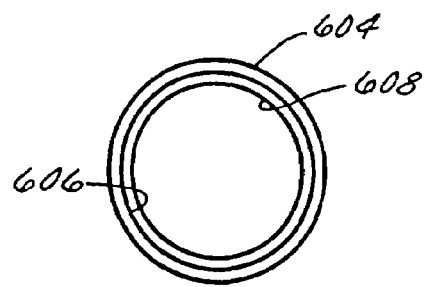
FIG. 29          FIG. 30
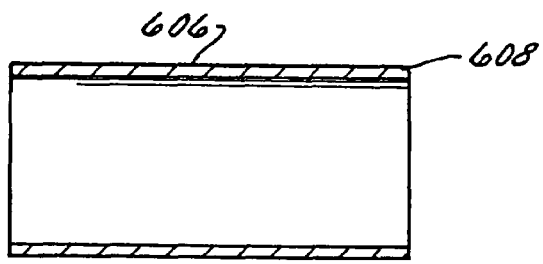 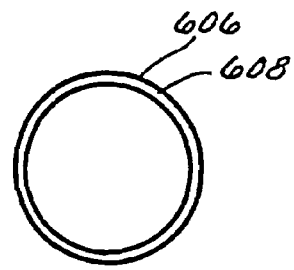
FIG. 31          FIG. 32
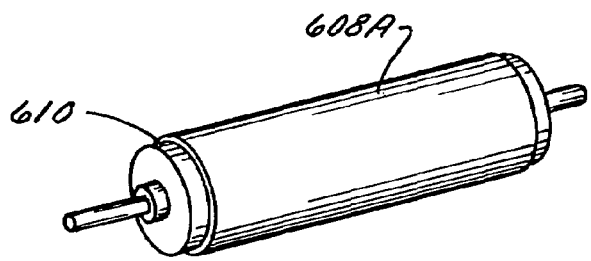
FIG. 33

SEAMLESS MASTER AND METHOD OF MAKING SAME

CROSS-RELATED APPLICATIONS

This application is a divisional application and claims priority from parent application Ser. No. 09/656,681 filed Sep. 7, 2000.

BACKGROUND OF THE INVENTION

1. Field of the Invention

The present invention, which has several aspects, is related to the field of light-shaping diffusers and is directed to a seamless master and method of making the same as well as seam replication of diffuser film, i.e. continuous light shaping coating without break point or break mark.

In particular, a first aspect of the present invention is directed to a hollow, cylindrical, seamless, invertable, elastomeric master with integral micro surface structure formed thereon and includes the method of making the same. A second aspect of the present invention is directed to a variable diffuser recording apparatus and process for manufacturing the same, in relation to the first aspect of the present invention. A third aspect of the present invention is directed to a seamless, cylindrical metal master with integral micro surface structure formed thereon and includes the method for forming the same, in relation to the other two aspects of the present invention. A fourth aspect of the present invention is directed to seamless (continuous film) production using the first three aspects.

2. Discussion of the Related Art

Diffuser masters are used to produce a vast assortment of light-shaping diffusers capable of desirably optically affecting light being transmitted therethrough.

Holographic light-shaping diffusers, for example, which are commercially available from Physical Optics Corporation ("POC") of Torrance, Calif., U.S.A., and sold globally under the trademark LSD® are diffusers that include "holographically-recorded," randomized surface structures providing the diffuser with high-transmission efficiency, beam-shaping qualities, and the ability to homogenize light. Though they are referred to as "holographically-recorded," they are preferably recorded using only one beam.

Further in that regard, U.S. Pat. No. 5,365,354 to Jannson et al. (assigned to POC), hereby incorporated by reference, discloses a diffuser having integrally-formed light-shaping diffuser microstructures, where the diffuser is manufactured from commercially available photosensitive medium, such as commercial photoresist, and wherein the photosensitive medium has preselected speckle patterns recorded therein.

Additional light-shaping diffusers are disclosed and described in U.S. Pat. Nos. 5,534,386 and 5,609,939 (both to Petersen et al. and assigned to POC) which are also hereby incorporated by reference. The methods taught in both of the Peterson patents can be used to produce and replicate internal and/or surface microstructures in a photosensitive medium such as conventional photoresist. The microstructures are able to diffuse light in a highly-efficient, uniform, and controlled manner, otherwise not possible via prior methods.

According to one prior method shown in U.S. Pat. No. 5,151,917 to Perilloux et al., microstructures are disclosed as forming a laminate with a substructure. In our applications, we have found that a laminated structure poses several problems. For example, certain problems associated with such a laminated construction relate to separation of the layers, transmission losses (due to reflection and/or refraction) at interface surfaces, or problems caused by differences in index of refraction values between the joined optical layers and the optical grade epoxy used to join them, or small air bubbles in the epoxy.

Preferably, the microstructures are integrally formed by coherent light in conventional photosensitive material, to produce light-shaping diffusers. Further in that regard, and depending on the angle of distribution, such light-shaping diffusers will achieve between 85% and 92% transmission efficiency, between 365 nanometers ("nm") and 1600 nm. Also, the low back-scatter of light-shaping diffuser structures are anti-reflective in nature, utilizing light that would otherwise be wasted due to Fresnel loss.

Underlying principles as to how LSD® diffusers work are summarized as follows. LSD® diffusers are replicated from a "holographically-recorded" master, typically, with only one beam. The light shaping and diffusing structures that result, completely random and non-periodic, may be thought of as micro lenslets. Moreover, LSD® diffusers are not wavelength-dependent, and will work in white, monochromatic, coherent, or incoherent light.

Beam-shaping qualities provide LSD® diffusers with an ability to precisely shape and distribute light. LSD® diffusers can produce outputs having circular angles ranging from about 0.5° to 100° and/or elliptical outputs ranging from about 0.2° by 5° to 110° by 90°.

The ability to homogenize light is important because so-called "hotspots" and uneven light-distribution patterns are common problems with such light sources as light-emitting diode ("LED") sources, filament-based and arc-based sources, and fiber optic and laser light sources. LSD® diffusers significantly "smooth" and homogenize the light from such sources while providing uniform light transmission in such critical applications as liquid crystal display ("LCD") backlights, LED displays, machine vision, automotive lighting, and viewing screens.

However, conventional masters that are used to manufacture the light-shaping diffusers are generally planar and of finite size. Current manufacturing procedures to produce light-shaping diffusers for viewing-screen applications, result in the edge boundaries of such masters overlying, abutting, or being placed adjacent to each other, resulting in associated edge-boundary patterns in the diffusers, called "seams," that are undesirable because they result in "interference" areas which adversely affect the ability of the diffuser to transmit light through the "seam" portions thereof. Also, when mass produced on long continuous sheets of plastic and rolled up for storage, the seams press against other diffusers in the roll, thus ruining them. Moreover, seams are not acceptable in many applications as large high definition displays for military training, Air Force flight simulator, FAA real time traffic control displays and commercial displays.

Recent improvements have resulted in such edge-boundary "seams" in the diffusers being reduced to a very thin line. Nevertheless, even a very thin line in the diffuser adversely affects the ability of the diffuser to be used for current wide-screen applications, some of which may be as wide as 30 feet wide or 40 feet wide, even up to about 100 feet wide, or more, as is currently contemplated by certain well-known entertainment areas throughout the world.

It would therefore be desirable to be able to produce a seamless master, for producing seamless LSD® diffusers. It would be even more desirable to be able to produce a diffuser of virtually unlimited length, and having a seamless light shaping diffuser surface thereon.

SUMMARY OF THE INVENTION

We solved an assortment of problems otherwise associated with diffusers and their associated diffuser-master edge-boundary "interference" patterns with our present invention which, briefly stated, is a seamless master and method of producing the same. Our invention, briefly summarized, has three aspects.

One aspect of the preferred embodiment is directed to a seamless master, that is cylindrical and of one-piece construction, and which has an integral seamless light-shaping diffuser surface formed on the exterior circumferential surface thereof. Such a seamless master is preferably hollow and is preferably made of a hard metal such as plated nickel.

Another aspect of the invention is directed to an apparatus and process whereby the seamless master, in turn, is manufactured utilizing a prior-made hollow cylindrical, seamless, elastomeric sub-master having the light shaping diffuser surface integrally-formed seamlessly thereon. The preferred elastomer is commercially-available silicone rubber. The seamless light shaping and diffusing surface is integrally formed on the circumferential surface of the hollow seamless elastomeric master. In connection with this particular aspect of our invention, the above-mentioned elastomeric master (elongated and having the appearance of a "sleeve"), and having the seamless light shaping diffuser surface initially integrally-formed on its interior circumferential surface, is invertable, whereby the elastomeric sleeve can be and is inverted to present the seamless integrally-formed light shaping diffuser surface on the exterior circumferential surface of the rubber sleeve.

Another aspect of our invention is directed to an apparatus utilizing a procedure for effecting variable diffuser recording in photosensitive medium. A final aspect of our invention is directed to utilizing the rubber sleeve or nickel cylinder, i.e. replica of rubber sleeve to produce seamless diffuser film on plastic substrates.

BRIEF DESCRIPTION OF THE DRAWINGS

A clear understanding and conception of the advantages and features constituting the present invention, including details associated with the above-summarized aspects of the invention, as well as the construction and operation of typical mechanisms provided with the invention, will become more readily apparent to those skilled in the art after referring to the exemplary, and therefore non-limiting, embodiments presented in the following description as well as in the accompanying drawings that form a part of this patent specification, wherein like reference numerals designate the same elements in several views, and in which:

FIG. 20 is an assembled, perspective view, on a slightly-reduced scale relative to FIGS. 18 and 19, depicting a solid cylindrical member disposed on the plate, which in turn is shown disposed on the base (of FIGS. 18 and 19), wherein the illustrated solid cylindrical member is a master having a seamless light-shaping diffuser surface-pattern integrally formed in the exterior circumferential surface thereof, and as such is a further embodiment of the hollow cylindrical member depicted in FIGS. 6, 10 and 11;

FIG. 21 is a further assembled, perspective view, partially in section, depicting hollow cylindrical mold portions, joined to encircle the cylindrical member of FIG. 20;

FIG. 22 is a fragmented plan view of the assembly presented in FIG. 21, depicting a gap (or annular spacing) that is present between the joined cylindrical mold portions shown in FIG. 21 and the thus-encircled solid cylindrical member shown in FIG. 20;

FIG. 23-2 is another embodiment of the side elevational view depicted in FIG. 23.

FIG. 24-2 is another embodiment of the end view depicted in FIG. 24.

FIG. 25 is a side elevational view, in section, showing additional layers of preferred materials on the exterior circumferential surface of the elastomeric member, with the result that the assembly is now shown as a multi-layered tubular composite, wherein the light-shaping diffuser surface is sandwiched between layers of the illustrated composite;

FIG. 26 is an end view of the multi-layered composite shown in FIG. 25;

FIG. 27 is a side elevational view, in section, depicting the outermost layer of the composite shown in FIGS. 25 and 26, after the remainder of the other layers are separated therefrom, wherein the tubular layer that remains has the light shaping diffuser surface seamlessly-formed and integrally-formed within its interior circumferential surface;

FIG. 28 is an end view of the thus-remaining tubular layer shown in FIG. 27;

FIG. 29-2 is another embodiment of the side elevational view depicted in FIG. 29.

FIG. 30-2 is another embodiment of the end view depicted in FIG. 30.

FIG. 31 is a side elevational view, in section, depicting the inner circumferential layer shown in FIGS. 29 and 30, after separation of the outer circumferential layer therefrom, wherein the thus-depicted hollow cylindrical member has the light-shaping diffuser surface seamlessly-formed and integrally-formed within its outer circumferential surface;

FIG. 32 is an end view of the hollow cylindrical member shown in FIG. 31; and

FIG. 33 is a perspective view of an elongated, further embodiment of the hollow cylindrical member depicted in FIGS. 31 and 32, shown mounded on a conventional rotatable member, in connection with a preferred industrial application for the present invention.

DESCRIPTION OF THE PREFERRED EMBODIMENTS

Figure 1:
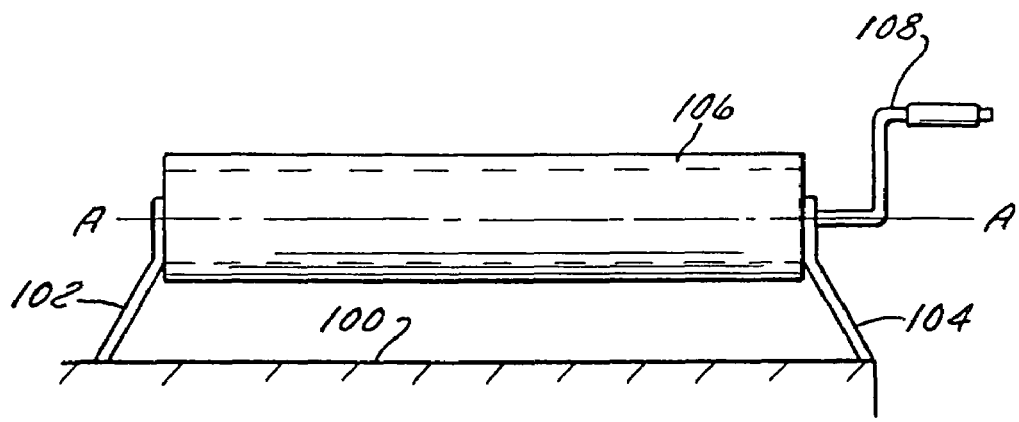
FIG. 1 is a side view depicting a mechanism which includes an elongated cylindrical rotatable member that is used to produce the elastomeric master of the present invention.
Figure 2:
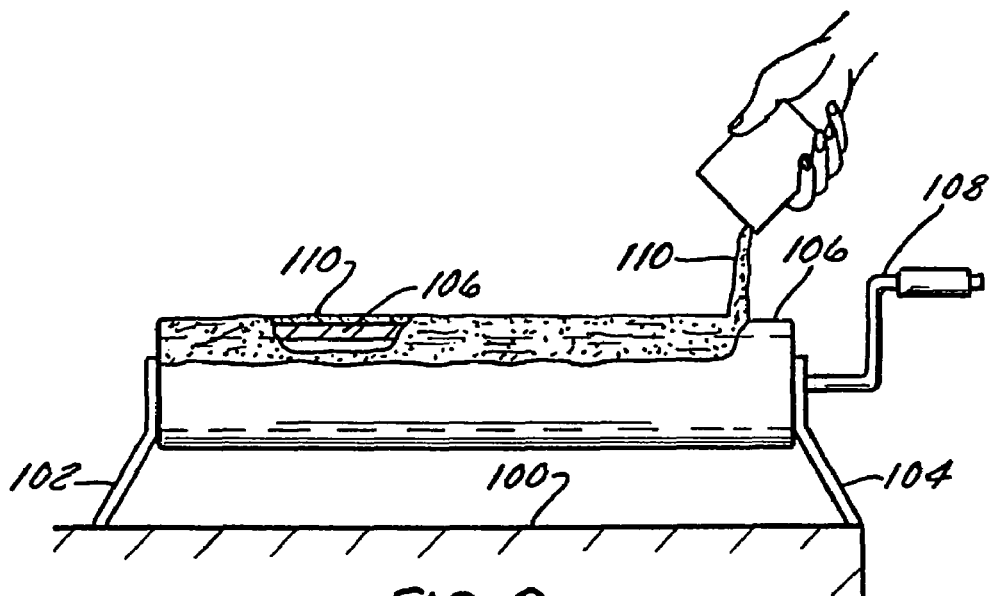
FIG. 2 is a subsequent, time-sequence-related side view, relative to FIG. 1, showing one preferred method of applying an effective amount of a commercially-available curable liquid photosensitive medium, such as conventional photoresist, to the external circumferential surface of the rotatable member shown in FIG. 1.
Figure 3:
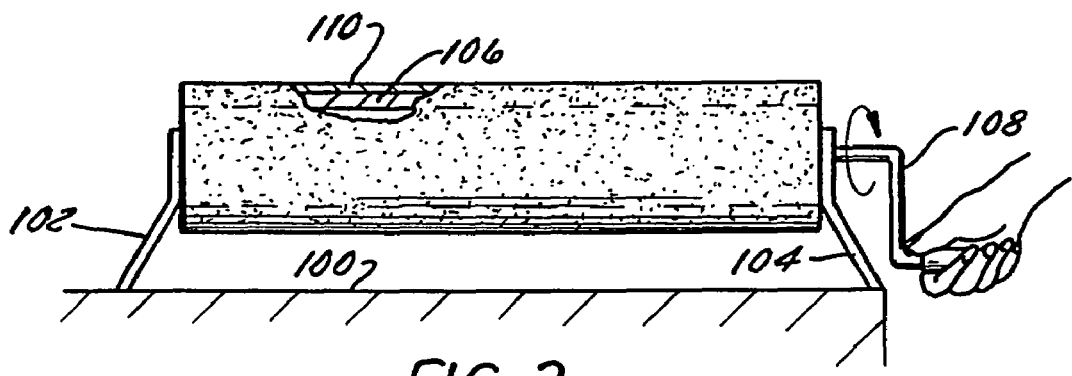
FIG. 3, also a side view, partially in section, shows a preferred method of causing the photosensitive medium to become a substantially seamless, uniform layer on the external circumferential surface of the rotatable member, after completing the "application" step shown in FIG. 2.

Referring to FIGS. 1-3, there is shown a method and apparatus for uniformly applying a suitable curable liquid photosensitive material, such as commercially-available photoresist, to an elongated, rotatable cylindrical member. In connection with the apparatus, there is shown a base 100, on which are mounted opposed arms 102, 104. The apparatus further includes an elongated hollow tube 106 (or tubular member) that is mounted between the arms 102, 104 and that is rotatable about an axis A-A by a crank 108, as shown in FIG. 1.

A preferred hollow tube 106 is made of commercially-available smooth glass, of e.g. normal window-pane variety. Another embodiment of hollow tube 106 can be manufactured from a suitably-smooth commercial plastic such as melamine, polycarbonate, polystyrene, polyvinyl chloride, or a suitable commercial acrylic plastic such polymethyl methacrylate.

One preferred method of applying a curable liquid photosensitive medium 110, such as photoresist, to the hollow tube 106 (preferably glass) is by pouring the photosensitive medium 110 by hand along the entire length of the hollow glass tube 106, as is shown in FIG. 2, and thereafter turning the crank 108 until the entire exterior circumferential surface of hollow tube 106 is coated with a uniformly-applied layer of photoresist. Such "application" is preferably done three times, with about forty minutes of air-drying time (at room temperature) between applications, with the result being that three separate layers of the thus-applied photoresist become the ultimate uniformly-applied layer of the curable liquid photosensitive medium 110.

The photosensitive medium 110, at the completion of the "three applications" step, has a radial thickness that may range from about 1 micron to about 100 microns. Preferably, the photosensitive medium 110 has a radial thickness of about 35 microns.

Figure 4:
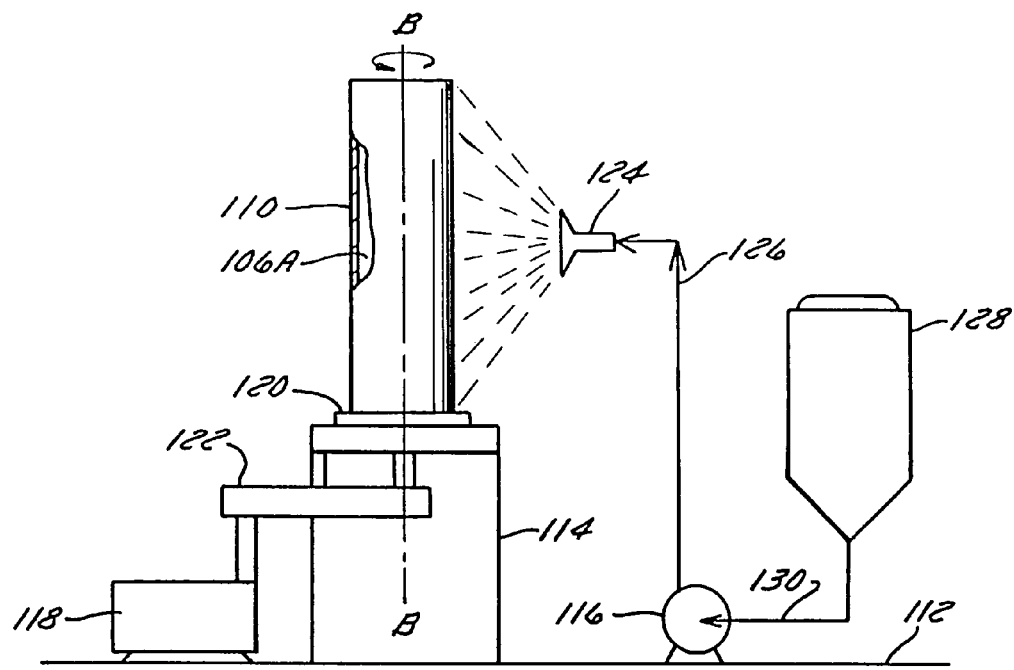
FIG. 4 is a side elevational view, partially in section, and partially in schematic, for showing an alternative method of uniformly applying a seamless layer of the curable liquid photosensitive medium to the external circumferential surface of an alternative embodiment of the elongated cylindrical member that is shown in FIGS. 1-3.

Shown in FIG. 4 is an alternative apparatus and method for applying curable liquid photosensitive medium 110, as a uniformly-applied circumferential layer, to the external circumferential surface of another elongated cylindrical member 106A, a solid cylinder.

FIG. 4 shows, mounted on floor 112, a platform 114, a pump 116, and a drive mechanism 118. The cylindrical member 106A is shown mounted on turntable 120 which, in turn, is rotatably mounted, about axis B-B.

A conventional power transmission mechanism 122, for rotatably driving turntable 120 about axis B-B, is coupled between drive mechanism 118 and turntable 120. Transmission mechanism 122 is used to transfer motive force from drive mechanism 118 to turntable 120 for rotating cylindrical member 106A about axis B-B, as shown in FIG. 4.

Still referring to FIG. 4, there is shown a nozzle 124 that is in fluid communication with pump 116 via conduit 126. Nozzle 124 is preferably so disposed and itself so configured as to provide conventional fluid, such as curable liquid photosensitive medium 110, along the entire length of cylindrical member 106A. For this purpose, curable liquid photosensitive medium 110, contained within tank 128, is supplied to pump 116 via conduit 130.

Figure 5:
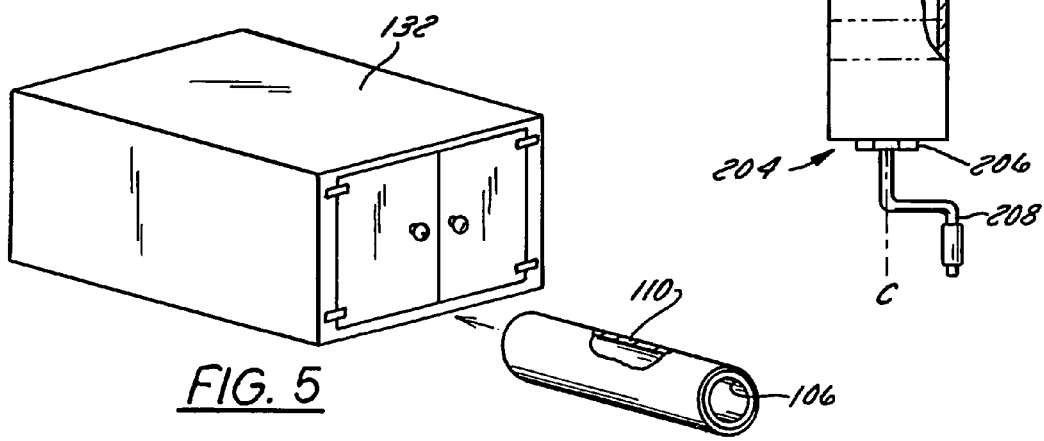
FIG. 5 is a perspective view of an apparatus for curing the photosensitive medium.
Figure 7:
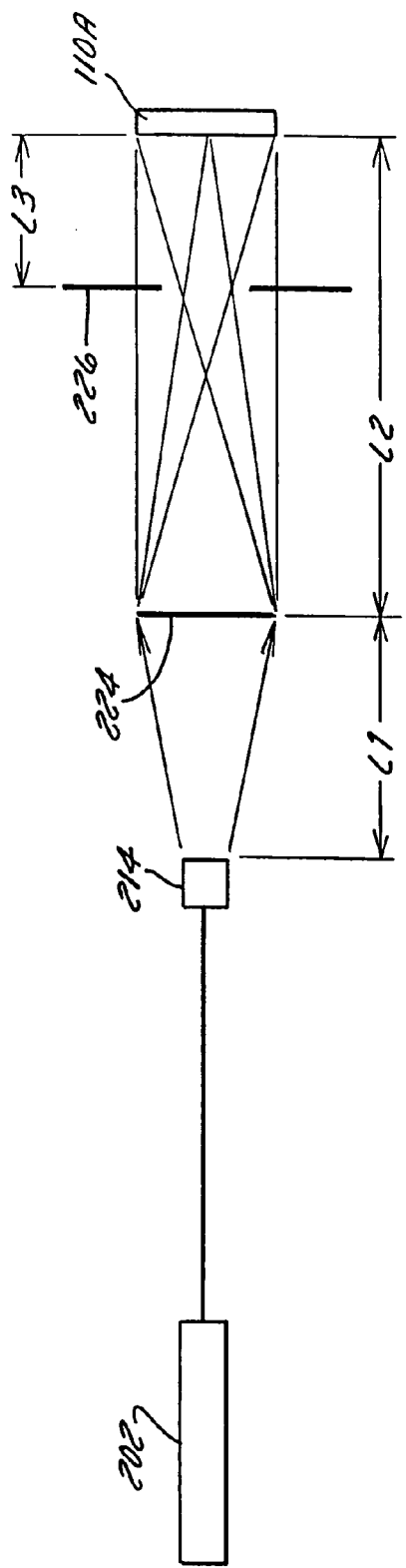
FIG. 7 is another schematic view, on a slightly enlarged scale relative to FIG. 6, for illustrating certain principles of the present invention.

Curing of the liquid photosensitive medium 110 is effected by baking. For example, FIG. 5 depicts a conventional oven 132, into which the solid cylinder 106A (not shown) or elongated hollow tube 106 (see, e.g., FIGS. 1-3) having a uniform layer of photosensitive medium 110 thereon, can be inserted for effecting desired curing of said medium 110. Desired curing of the photosensitive medium 110 is effected by baking the medium 110 at elevated temperature, e.g., 100° C., for about 40 minutes to about 2 hours. More preferably, curing of the photosensitive medium 110 is effected by baking the medium 110 at about 90° C. for about 1 hour to about 2 and ½ hours. Still more preferably, curing of the photosensitive medium 110 is effected by baking the medium 110 at about 60° C. for about 1 to 3 hours.

Variable diffusers have conventional uses, e.g., in connection with light pipes and liquid crystal displays. For example, flat panel displays, such as liquid crystal displays ("LCDs") that are used in laptop computers, generally incorporate a backlighting system to illuminate a liquid crystal-based display panel. Important requirements of conventional backlighting systems are to provide substantially uniform light distribution as well as sufficiently intense light distribution over the entire surface of the display panel, which is generally planar. To accomplish these two requirements, state-of-the-art backlighting systems typically incorporate one or more light pipes into the system, to couple light energy from a light source to the LCD panel. In connection with conventional scattering backlight systems, it would be desirable to incorporate into the system one or more variable-diffuser elements which could, e.g., be disposed along one surface of one or more conventional light pipes, for the purpose of scattering light rays incident thereto toward an output plane to achieve predetermined criteria. The output plane could, e.g., be coupled to a state-of-the-art LCD panel in a conventional manner so as to result in coupling the light rays into and through the LCD panel. Such a scattering backlighting system, by incorporating a variable diffuser able to direct light from the LCD panel edge uniformly across the screen and in the direction of the user, would not only offer the ability to control the distribution of light by controlling the distribution of the scattering media on the scattering surface but would also provide the ability to control the angle of light distribution, which are both desirable results.

Accordingly, referring next to FIGS. 6-11, there are depicted principles and preferred components of a preferred method and apparatus for effecting variable diffuser recording in a photosensitive medium, one of the aspects of the present invention that was briefly noted above.

More particularly in this regard, FIGS. 6-11 depict a preferred method, apparatus and components, for subjecting the cured layer of photosensitive medium to a source of coherent light while rotating the cylindrical member about its longitudinal axis, to expose the cured photosensitive medium substantially along the length and exterior circumferential surface thereof, for producing different predetermined light shaping and diffusing microstructures in the exposed photosensitive medium substantially along the length and exterior circumferential surface thereof, wherein the exposed photosensitive medium is able to be developed for recording the speckle pattern therein.

A preferred coherent light (or radiation) source is a conventional laser. In this regard, select commercially-available UV excimer lasers as well as krypton lasers may be used.

Figure 6:
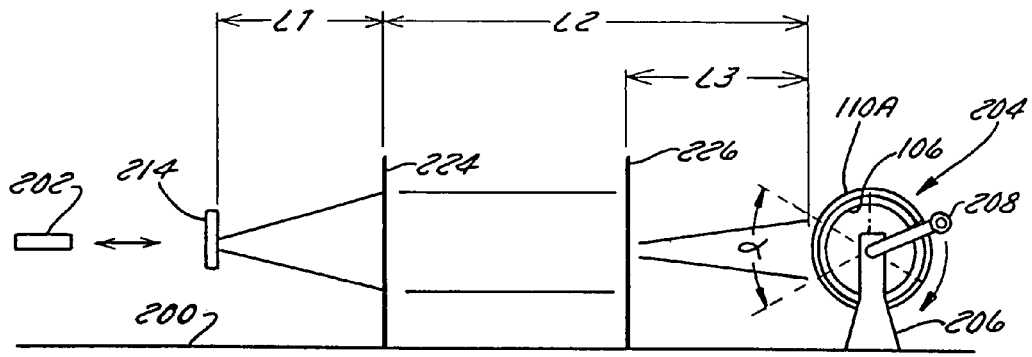
FIG. 6 is a side elevational view, also in schematic, illustrating a preferred apparatus and process for effecting variable diffuser recording in the cured photosensitive medium.
Figure 10:
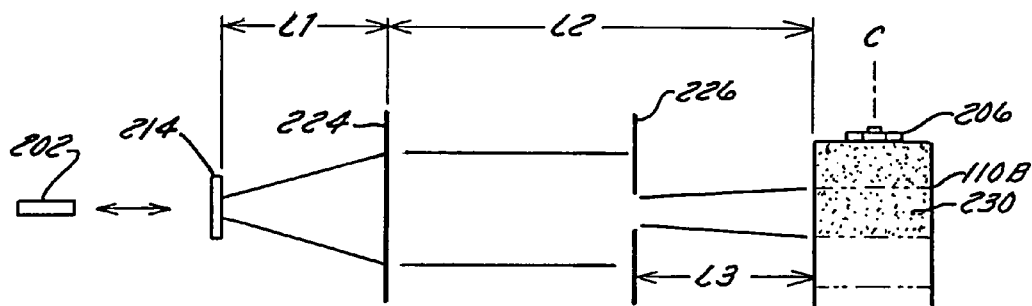
FIG. 10 is a top plan view of the side elevational, schematic view of FIG. 6.

Referring initially to FIG. 6, the illustrated apparatus is seen to include a base 200 and a source 202 of coherent light spaced from the base 200. A preferred source of coherent light is a laser. The illustrated apparatus is depicted as including an elongated mechanism 204, which itself is characterized as including spaced-apart mounts 206 (one of which is shown in the foreground in FIG. 6), fixed to the base 200, and a crank 208 rotatably carried by the mounts 206 (both of which are shown in FIG. 10), wherein crank 208 is rotatable about an axis C-C, spaced above and disposed generally parallel to the base 200, wherein the mounts 206 are disposed to rotatably present tube 106 transverse to the source 202 of coherent light.

Still referring to the illustrated apparatus for effecting variable diffuser recording in a photosensitive medium, the hollow cylindrical member 106 (see, e.g., FIGS. 1-3), rotatably mounted on the mechanism 204 (FIGS. 6, 10 and 11), is depicted as having a cured, uniform layer of photosensitive material 110A on the external circumferential surface thereof.

The illustrated apparatus is further depicted as including an optical objective device 214 spaced above the base 200. Objective device 214 is located between the source of coherent light 202 and the hollow cylindrical member 106, for effecting physical relationships depicted in FIGS. 6, 7, 10 and 11, which relationships will be described in detail hereinbelow.

Figure 8:
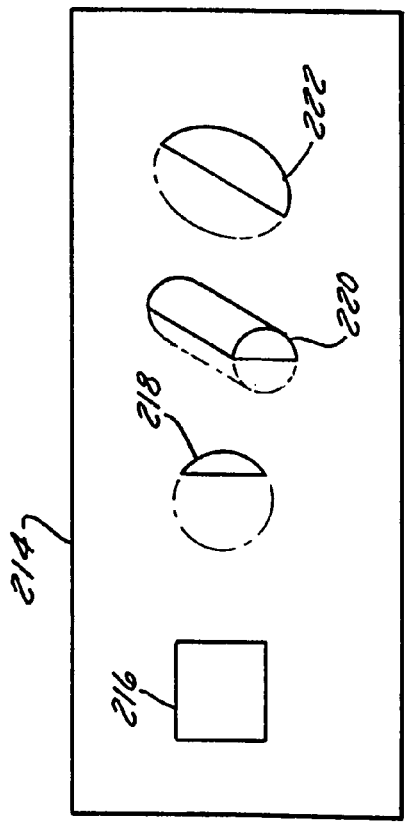
FIG. 8 is a detailed view, further enlarged relative to FIG. 7, and shown for the purpose of depicting several preferred components of a preferred objective device that is used in connection with one of the above-summarized aspects of the present invention.

Referring briefly to FIG. 8, there is shown a preferred optical objective device 214, which may be characterized as including a magnification lens 216, typically 20× to 60×, a spherical lens 218, a cylindrical lens 220, an elliptical lens 222, and combinations thereof, for providing a magnification component, a cylindrically-elongated component, an elliptically-elongated component, and combinations thereof, respectively, to the cross-sectional area of coherent light.

Returning to FIGS. 6, 10 and 11, the illustrated apparatus is seen to further include a diffuser mask 224, mounted on the base 200 and located between the objective device 214 and the cylindrical member 106, for diffusing and imparting to the coherent light from source 202 a preselected irregular speckle pattern, which pattern thereafter exposes the cured photoresist layer 110A on the external circumferential surface of cylindrical member 106.

As can be appreciated by those skilled in the art, coherent light passing through optical objective device 214 may have its cross-sectional area either magnified, or reduced, and/or cylindrically-affected, and/or elliptically-affected, as desired, by the precise combination of components that are selected for inclusion within the objective device 214 that is selected.

However, it is not widely known by those skilled in the art that special diffusers may be designed to achieve such a result. For example, to achieve such a result via special diffuser, the optically light-transmissive mask 224 preferably is a holographic diffuser capable of imparting a desired, preselected speckle pattern to the light used to record the photosensitive medium, as is described in U.S. Pat. No. 5,365,354 (to Jannson et al.) and U.S. Pat. Nos. 5,534,386 and 5,609,939 (both to Petersen et al.), all of which have been assigned to Physical Optics Corporation of Torrance, Calif., U.S.A., and hereby incorporated by reference. Briefly summarizing these patents, our colleagues have discovered that preselected irregular speckle patterns used to record diffusers enable the diffusers, upon playback, to modify desirably the shape of the output light that is passing through the diffuser. A ground glass, or other suitable light-transmissive mask 224 may also be used.

Referring to FIG. 6, the illustrated apparatus is shown further including a blocker 226, that defines an aperture 228 (FIG. 9) of preselected dimensions, wherein blocker 226, carried by base 200, is so located and oriented between the diffuser mask 224 and the cylindrical member 106 as to be used for desirably and selectably effecting exposure of a preselected portion (shown in FIG. 10 as circumferential band 230) of the cured layer of photosensitive medium 110B, now exposed but as yet undeveloped, on the external circumferential surface of hollow cylindrical member 106.

Figure 9:
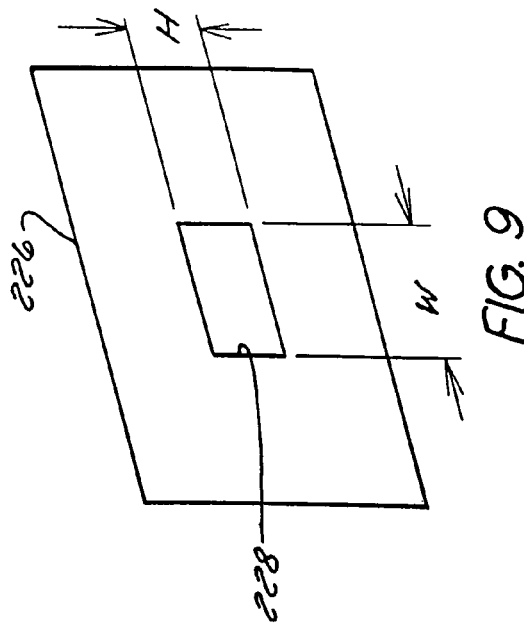
FIG. 9 is a perspective view, on a slightly enlarged scale relative to FIG. 7, depicting preferred aperture geometry of an element, presented on-edge in FIGS. 6 and 7, which is yet another component of the above-mentioned aspect of the present invention.

Referring to FIG. 9, preferred blocker 226 is of generally planar shape and construction, and is orientated generally normal to the path of the coherent light, as can be seen from FIGS. 6, 7, 10 and 11.

With further reference to FIG. 9, the aperture 228 is depicted as being generally rectangular in shape, with relatively sharp edges and having a width ("W") ranging from about 3 inches to about 10 inches and a height ("H") of about 3 inches to about 5 inches, preferably about 4 inches, but depending on the size of the cylindrical member 106.

Further in reference to the illustrated apparatus for effecting variable diffuser recording in photosensitive material, a first length ("L1") dimension as shown in FIGS. 6, 7, 10 and 11 is defined as the distance traveled by the coherent light between the optical objective device 214 and diffuser mask 224.

A second length ("L2") dimension is defined as the distance traveled by the coherent light between the diffuser mask 224 and the now exposed (FIG. 7) layer of photosensitive material 110B on the external circumferential surface of cylindrical member 106.

A third length ("L3") dimension is defined as the distance traveled by the coherent light between the exposed layer (FIG. 7) of photosensitive medium 110B on the cylindrical member 106 and the apertured (FIG. 9) blocker 226.

During normal operation of the illustrated apparatus, it is contemplated that any one of the first, second, and third length ("L1"-"L3") dimensions can be changed, and controllably is changed pursuant to selected criteria, relative to any other one of said length ("L1"-"L3") dimensions, for effecting variable diffuser recording in the photosensitive medium 110A.

In operation, rotation of the hollow cylindrical member 106 about axis of rotation C-C of the mechanism 204 is for causing the unexposed layer of photosensitive medium 110A on the external circumferential surface of cylindrical member 106 to be exposed to coherent light (from source 202) passing initially through optical objective device 214, and thereafter through diffuser mask 224, and finally through the aperture 228 of blocker 226, resulting in exposure of a portion of the photosensitive material 110B on tube 106.

From the above, a process for effecting variable diffuser recording in photosensitive medium may be summarized as follows.

Such a process may be characterized as including the step of providing the elongated cylindrical member 106, rotatably mounted on mounts 206 and disposed along the longitudinal axis C-C, with a cured, unexposed layer of photosensitive medium 110A, which is located on the external circumferential surface of cylindrical member 106.

The process further contemplates including the steps of directing the coherent light beam produced by the source of coherent light 202 toward the cured, unexposed photosensitive medium 110A, and interposing the optical objective device 214 in the coherent light beam between the coherent light beam source and the unexposed photosensitive medium 110A.

The process further includes the steps of interposing the optically light-transmissive diffuser mask 224 in the coherent light beam between the optical objective device 214 and the unexposed photosensitive medium 110A, and then separately interposing the blocker 226 defining the aperture 228 of preselected dimensions in the coherent light beam between the optically light-transmissive diffuser mask 224 and the unexposed photosensitive medium 110A.

The process also contemplates the step of next changing the distance ("L1" and/or "L2" and/or "L3") dimensions between the diffuser mask 224 and optical objective device 214, or diffuser mask 224 and layer of unexposed photosensitive medium 110A, and/or blocker 226 and layer of unexposed photosensitive medium 110A, for effecting variable exposure of the layer of cured, unexposed photosensitive medium 110A.

Such a process further includes the steps of rotating the cylindrical member 106 via crank 208 or by motor (not shown) through a preselected angle "alpha" $\alpha$ (shown in FIG. 6) about its elongated axis C-C, thereby exposing the resultant arcuate portion of the layer of unexposed photosensitive medium 110A, within narrower band 230 (FIG. 10) or wider band 230A (FIG. 11), to coherent light, for a preselected period of time, for the purpose of exposing the wider band 230 or the narrower band 230A, whichever is appropriate, for the now exposed photosensitive medium 110B.

The process further includes the step of continuing to rotate cylindrical member 106 through said preselected angle in the presence of the coherent light, thereby to expose the entire circumferential boundary of narrower band 230 (FIG. 10), or entire circumferential boundary of wider band 230A (FIG. 11), of the unexposed photosensitive medium 110A on the illustrated cylindrical member 106.

Figure 11:
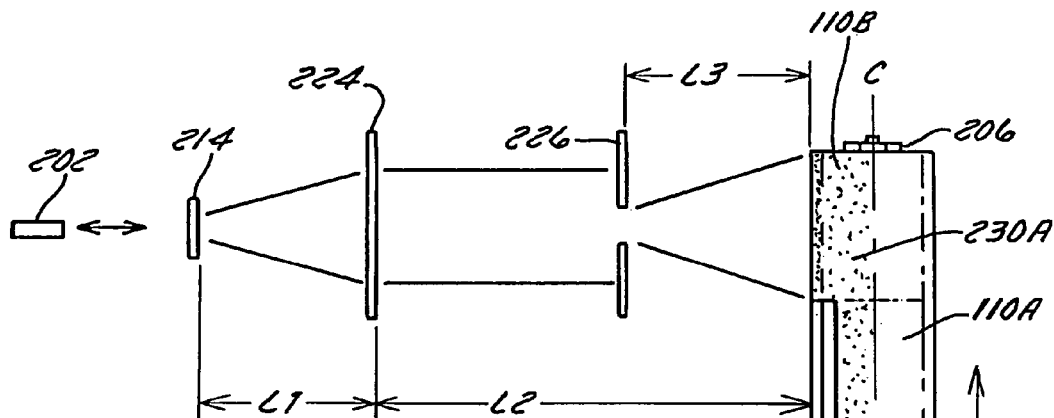
FIG. 11 is another embodiment of a top plan view, also based on the side elevational, schematic view of FIG. 6, and shown for purposes of illustrating features of the above-mentioned apparatus and process for effecting variable diffuser recording in photosensitive medium, which is achieved by selectively varying spaced relationships of components shown (thereby to apply associated principles illustrated) in FIGS. 7-9, which provide details relating to the exposure of the cured photosensitive medium, as illustrated in FIGS. 6, 10 and 11.

Referring to FIG. 10, circumferential band 230 is thus defined as the longitudinal portion of the lengthwise circumferential exterior surface of exposed photosensitive medium 110B, rotated through 360°, on cylindrical member 106. A similar lengthwise circumferential exterior surface of exposed photosensitive medium 110B is shown in FIG. 11 as the relatively wider circumferential band 230A. Accordingly, the process includes moving the cylindrical member 106 a preselected longitudinal or transverse distance (as depicted in FIGS. 10 and 11) relative to the light source, and repeating the above-recited steps until the entire circumferential exterior surface of the unexposed layer of photosensitive medium 110A is exposed.

Summarizing the above, a variable diffuser can thus be manufactured by (1) partially rotating tubular member 106 about axis C-C (FIGS. 10 and 11) to present a desired portion of unexposed photosensitive medium 110A on tube 106; (2) selecting suitable lenses 216, 218, 220 and/or 222 for objective device 214; (3) selecting the aperture 228 (FIG. 9) that provides the desired "W" and "H" dimensions; (4) selecting appropriate relative distances L1, L2 and L3 and mask 224 (FIG. 7); and (5) energizing coherent light source 202 to achieve a desired speckle pattern in the exposed photosensitive medium 110B that results. Thereafter, tube 106 with still unexposed photosensitive medium 110A thereon may be moved laterally (FIGS. 10 and 11) relative to the incident light beam, as desired, and steps (2) through (5) repeated to achieve longitudinally variable diffuser properties in exposed photosensitive medium 110B on tube 106. Alternatively, steps (1) through (5) may be repeated to achieve circumferentially variable light-diffuser properties in exposed photosensitive medium 110B on tube 106. In accordance with principles of our invention, a variable diffuser consisting of either narrow circumferential bands 230 (FIG. 10) or wider circumferential bands 230A (FIG. 11), or combinations of narrow and wide circumferential bands 230, 230A, as desired, and each having been recorded with various light shaping and diffusing microstructures which yield different light output characteristics upon playback, can thus be made on a single tubular member such as tube 106. Additional principles of the illustrated and above-described apparatus and process for effecting variable diffuser recording in photosensitive medium may be discerned from data presented in the following Table, along with our following discussion of that data.

Figure 23A:
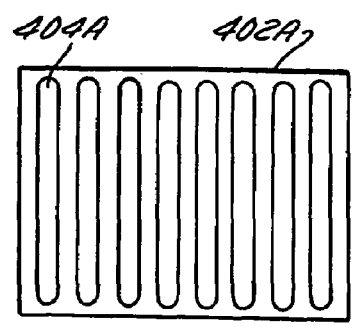
FIG. 23A schematically depicts speckle, on a greatly enlarged scale, that are present in the light which is used to record the light-shaping diffuser surface-pattern on the elastomeric sleeve, integrally-formed in the circumferential surface of the cured elastomeric master (produced by the method illustrated in FIGS. 14-17), wherein the speckle are produced by using a cylindrical lens, in reference to the variable diffuser recording apparatus and process (including principles thereof) illustrated in FIGS. 7-9.
Figure 23B:
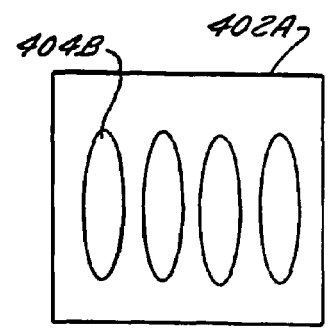
FIG. 23B schematically depicts speckle, on a greatly enlarged scale, that are present in the light used to record the light shaping diffuser surface-pattern of the elastomeric sleeve, integrally-formed in the circumferential surface of the cured elastomeric master (produced by the method illustrated in FIGS. 14-17), wherein the speckle are produced by using an elliptical lens, in reference to the variable diffuser recording apparatus and process (including principles thereof) illustrated in FIGS. 7-9.

The last column of the TABLE lists the angles of the output of the final master, i.e., the angle of the cone of shaped light output by the final master. In the first two entries, one listed angle corresponds to a circular output of light while TABLE entries having two angles correspond to the major and minor angles of an elliptically shaped output. Also, where there are two angles listed, the first angle is the angle that was disposed along the length of tube 106 during the exposure step, while the second angle is the angle that was disposed arcuately along the circumference of unexposed photosensitive material 110A. Such elliptical outputs result from the presence of the elliptical nature of the objective disclosed in the first column of the TABLE and/or the elliptical nature of the mid-master disclosed in the TABLE. Mid-masters having elliptical outputs preferably were themselves previously recorded as elliptical LSD® diffusers by being exposed to recording light having elliptical speckle as depicted in FIGS. 23A and 23B.

Also further note that L2, in general, is relatively large for small angles, and relatively small for large angles. The various parameters presented in the TABLE may thus be varied, to produce a light shaping diffuser pattern in one or more portions of the exposed photosensitive material 110B (see, e.g., FIGS. 6-11), which is either arcuately disposed or longitudinally disposed, along the exterior circumferential surface of tube 106, as desired. Lastly, we have advantageously discovered that the exposure of the photosensitive material, as herein described and disclosed, results in exposures that are so feathered together at edge margins, as to produce truly seamless diffuser masters, even where adjacent portions of the master have been recorded with different recording setups.

In accordance with this aspect of our invention, exposed photosensitive material 110B on tube 106, after being developed (see, e.g., FIGS. 23 and 13), is one such truly seamless diffuser master, and the exposed and subsequently developed photosensitive material 110C is used to produce additional seamless masters, as will be described in detail hereinbelow.

The following EXAMPLE discloses and describes select procedures and equipment (well known to those in the art) that we used to generate the data presented in the TABLE.

TABLE

| Device 214 Objective Cylindrical Elliptical | L1 | Mask 224 Mid-Master | L2 | L3 | Exposed Photoresist Media 110B Final Master |
|---|---|---|---|---|---|
| Obj: 20× | 5 inches | 3° | 87 inches | 6 inches | 5° |
| Obj: 40× | 19 inches | 4° | 73 inches | 4 inches | 20° |
| Obj: 60× Elli: 45 × 0.28 | 60 inches | 13° × 5° | 35 inches | 1 inch | 100° × 90° |
| Obj: 60× Elli: 45 × 0.28 | 22 inches | 13° × 5° | 40 inches | 2 inches | 60° × 40° |
| Obj: 60× Elli: 45 × 0.28 | 11 inches | 13° × 5° | 50 inches | 3 inches | 50° × 10° |
| Obj: 40× Cyl. | 8 inches | 20° × 0.2° | 86 inches | 5 inches | 20° × 1° |
| Obj: 20× Cyl. | 7 inches | 20° × 0.2° | 80 inches | 4 inches | 6° × 0.3° |
| Obj: 60× Cyl. | 8 inches | 20° × 0.2° | 43 inches | 4 inches | 60° × 0.5° |
| Obj: 60× Cyl. | 59 inches | 13° × 5° | 34 inches | 1 inch | 130° × 70° |

EXAMPLE

To Arrange Beam and Mounting

Set suitable objective (normally 20× to 60×); put on pinhole filter when it is necessary. Put Mid-master diffuser holder in place on a suitable table; securely clamp-down Mid-master diffuser. Put onto holder a suitable Mid-master, according to desired scattering angle. Put a Final-master and associated holder in place; clamp and fasten (e.g., glue) holder down securely. When setting-up for the big proportion elliptical diffuser master, as shown in the TABLE, set the cylindrical lens following the objective in a manner so as to form a "soft" edge focus 3 to 9 inches wide. Direct the slit beam to the center of the Mid-master. Place all blockers to prevent any stray light from falling on the Final-master. Finally, adjust the coherent light to the Final-master to read, about 30 μm watts.

Figure 12:
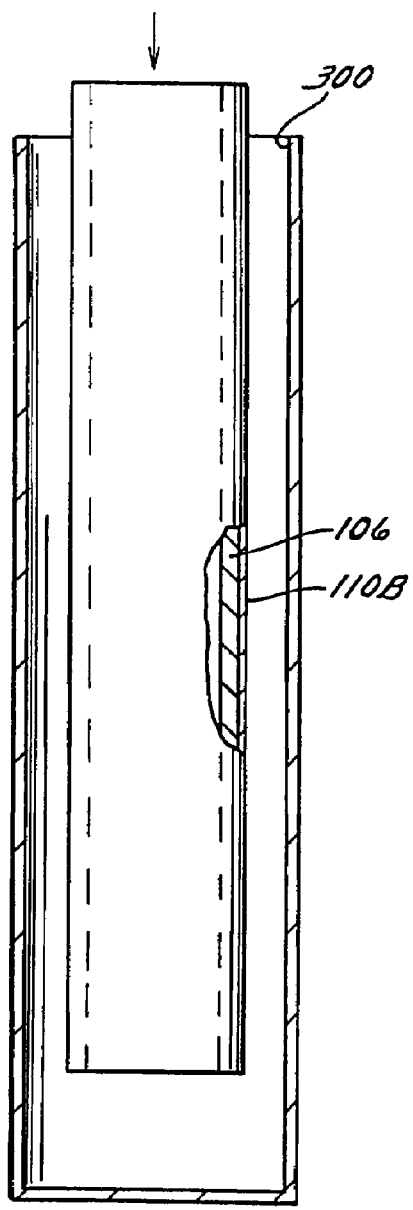
FIG. 12 is a side elevational view, partially in section, showing a hollow container so dimensioned as to receive the cylindrical member having the cured, exposed photosensitive medium on the circumferential surface thereof, further showing the cylindrical member being inserted into the hollow container.

Thus concludes the description associated with the EXAMPLE. Accordingly, reference is invited to FIGS. 12 and 13, for the following description as to how exposed, undeveloped photosensitive medium 110B is converted to developed photosensitive medium 110C.

Development of the now-exposed photosensitive material 110B begins by selecting a suitable hollow cylindrical container 300 (FIG. 12) having a length and inner diameter sufficient to captively receive and retain the cylindrical member 106 having the exposed layer of photosensitive medium 110B on the exterior circumferential surface thereof.

Then, tube 106 is disposed into container 300. Thereafter, a commercially-available developer solution 312 is poured into the container 300, preferably in the annular space between container 300 and cylindrical member 106, as shown in FIG. 13.

Figure 13:
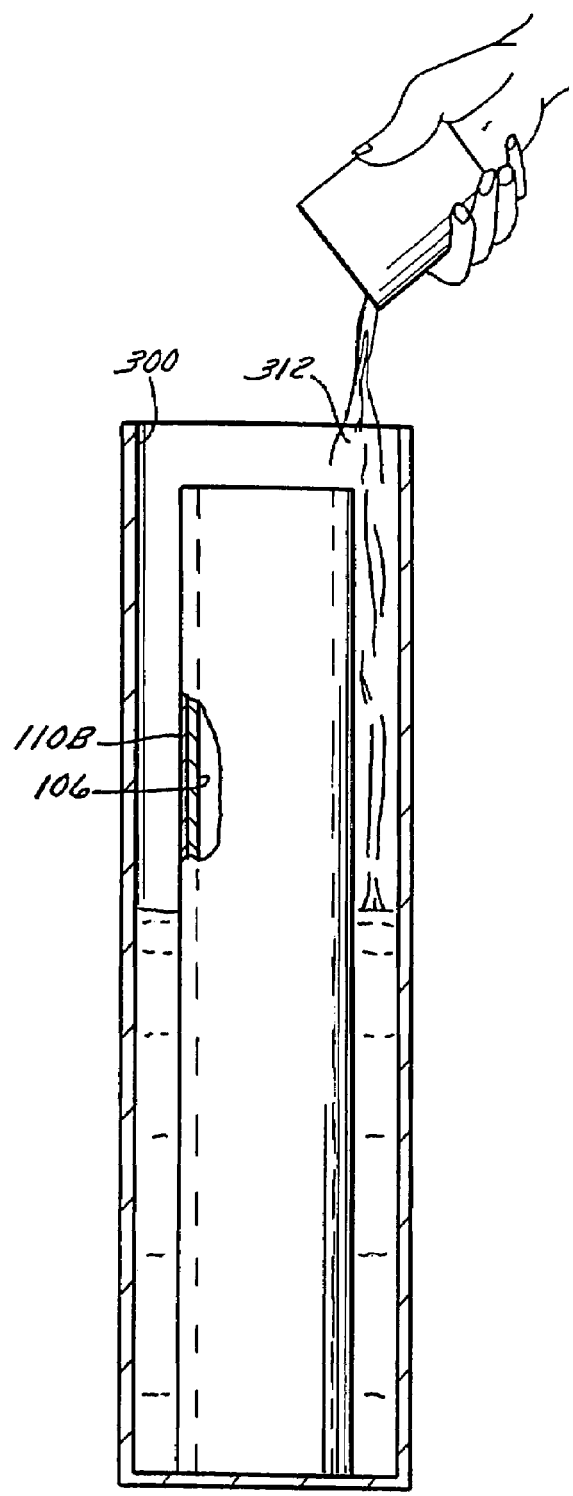
FIG. 13, also a side elevational view and partially in section, depicts a preferred method for developing the exposed photosensitive medium, in which method the cylindrical member (shown in FIGS. 1-3) is shown as having the exposed photosensitive medium (depicted in FIGS. 6, 10 and 11) on the exterior circumferential surface thereof, which is a subsequent step of the "inserting" step shown in FIG. 12.

Thus, as is depicted in FIG. 13, development of the exposed photosensitive material 110B is preferably brought about by contacting the exposed photosensitive medium 110B with an effective amount, preferably a 10% aqueous solution, of a commercially-available developer solution 312, for an period of time ranging from about 30 seconds to about 1 minute.

Alternatively, a set-up similar to what is shown in FIG. 4 can be used to develop the exposed photosensitive medium. For example, the exposed photosensitive material may have the developer solution sprayed thereon, and the resultant developer run-off can be collected in certain structure (not shown) to collect (and perhaps re-use) the developer solution, as desired.

In any event, upon completion of the development step, a light-shaping diffuser surface, characterized by preselected irregular microstructures, is fixed in the developed photosensitive medium along the entire length and exterior circumferential surface of cylindrical member 106. The light shaping diffuser surface is, on a microscopic scale, an elongated selective variation of the elements and/or components of the above-described diffuser-recording apparatus shown in FIGS. 6-11. Moreover, as can be appreciated by those skilled in the art after reading this disclosure, the substitution of one or more of the illustrated components with a functionally-equivalent mechanism will result in the desired orientation of the microstructures of the light shaping diffuser surface: that is, e.g., either perpendicular to or parallel with the longitudinal axis of cylindrical member 106, as desired.

We have also discovered that overlap effects at edge margins, as might be expected to be caused by overlap of either the exposed narrow cylindrical bands 230 of one embodiment (FIG. 10) or the exposed wide cylindrical bands 230A of the other embodiment (FIG. 11) have resulted not in the presence of seams along such overlap areas but rather in the production of a light-shaping and diffusing surface that is continuous and truly seamless, substantially along the entire length and exterior circumferential surface of cylindrical member 106.

Reference to FIGS. 14-17 is now made, to describe a preferred method for applying a curable elastomeric liquid 400 to cylindrical member 106, wherein the cylindrical member 106 now is provided with a light-shaping diffuser surface fixed substantially along the entire length and exterior circumferential surface of cylindrical member 106, wherein the light shaping diffuser surface is provided by the developed photosensitive medium 110C on cylindrical member 106.

Figure 15:
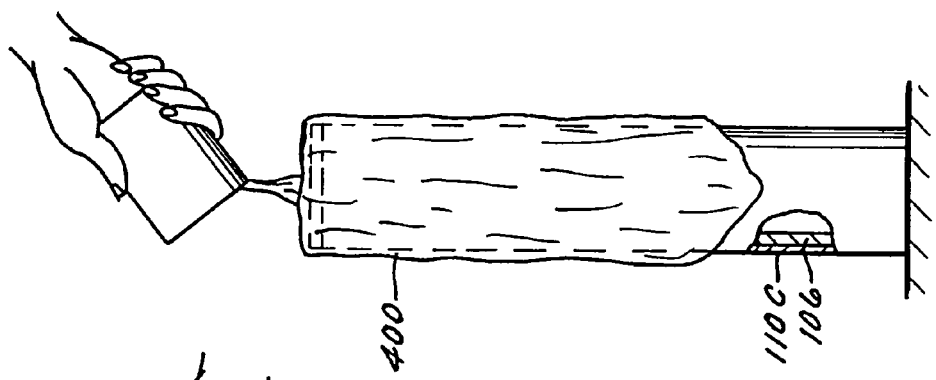
FIG. 15 is a side elevational view, partially in section, depicting a later time sequence of the method for uniformly applying curable elastomeric material onto the illustrated exposed and subsequently developed photosensitive medium, which method is shown in FIG. 14.
Figure 14:
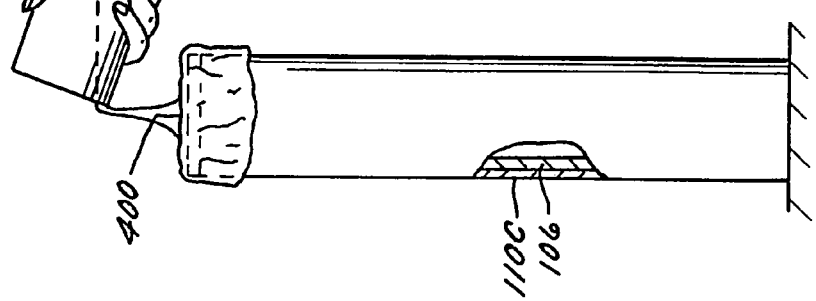
FIG. 14 is a side elevational view, partially in section, depicting a preferred method of uniformly applying a curable elastomeric liquid onto the exterior circumferential surface of the exposed photosensitive medium, on completion of the photosensitive medium-development method depicted in FIGS. 12 and 13.

Curable elastomeric liquid 400 is applied along the length and exterior circumferential surface of developed photosensitive material 110C on cylindrical member 106, for example, by pouring a suitable commercially-available curable liquid elastomeric material onto a vertically disposed commercially-available cylindrical member 106, as is shown in FIGS. 14 and 15.

Figure 16:
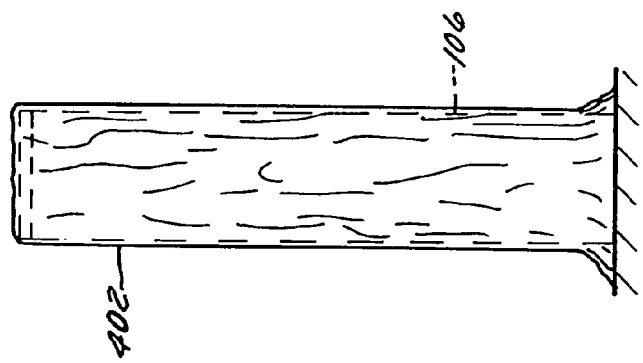
FIG. 16 is a side elevational view, which depicts completion of the preferred method of uniformly applying a curable liquid elastomeric material onto the exterior circumferential surface of the developed photosensitive medium, whereby an elongated and hollow cylinder (having substantially uniform wall thickness) of curable elastomeric material is produced.

A sufficient amount of the curable elastomeric liquid 400 is poured onto tubular member 106 (FIG. 15) to cover the entire length and exterior circumferential surface of tubular member 106, thereby producing a hollow cylindrical elastomeric member or sleeve 402, as is shown in FIG. 16. Next, the uncured elastomeric member or sleeve 402 covering tube 106 is cured, thereby producing a cured hollow cylindrical elastomeric member or sleeve 402A (FIG. 17), which can readily be inverted, and thereby separated from cylindrical member (or tube) 106.

Preferably the invertible, hollow cylindrical elastomeric member 402A has a radial thickness of about 1/16 inches to about 1/8 inches. Since the cured elastomeric member 402A, prior to being cured, had been in intimate contact with the microstructures of the light shaping diffuser surface recorded in the photosensitive medium on cylindrical member 106, the cured elastomeric member 402A that results, has formed integrally within its surface a seamless light-shaping diffuser surface, along the entire circumferential surface where the uncured elastomeric member 402 (FIG. 16) has been in intimate contact with the microstructures on the surface of cylindrical member 106. Initially, the microstructures are on the interior circumferential surface of uncured elastomeric member 402. After curing, and upon inversion (see, e.g., FIG. 17), the microstructures and the light-shaping diffuser surface are presented on the exterior circumferential surface of cured elastomeric member 402A.

Figure 17:
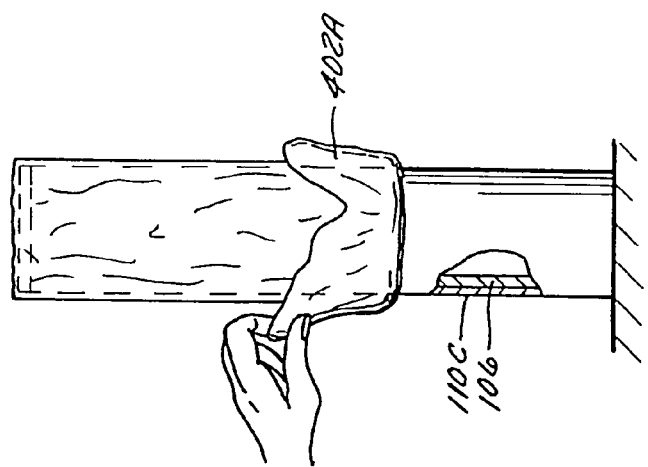
FIG. 17 is a side elevational view, in section, that serves to depict, after the illustrated elastomeric material is cured, a preferred method of separating the now-cured elastomeric member (which has the appearance of a sleeve) from the developed photosensitive medium, which is by inverting the cured hollow cylinder of elastomeric material.

Still referring to FIG. 17, note that the cured elastomeric member 402A, at this point, could itself be used to produce seamless diffusers, by a process which those skilled in the art would appreciate after reading this disclosure. However, we prefer to use elastomeric member 402A to produce far more durable seamless masters, as will be described in detail hereinbelow.

To cure the illustrated uncured elastomeric member 402 (FIG. 16), we prefer to subject the thus-poured elastomeric material to room temperature for a period of about 24 hours. As defined herein, the term "room temperature" is understood to mean 77° F. (25° C.).

Reference is next made to FIGS. 18-22, for the purpose of describing an alternative method for producing the cured hollow cylindrical elastomeric member described above.

The alternative method, which utilizes the illustrated elements and components of FIGS. 18-22, may be described as follows.

Figure 18:
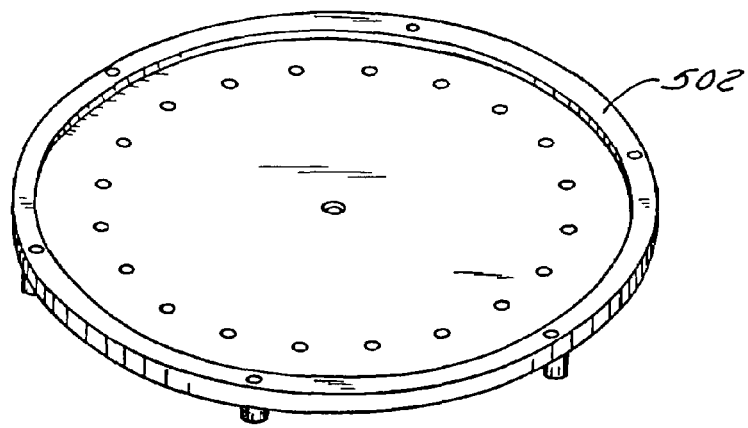
FIG. 18 is a perspective view of a base, which is a component of yet another embodiment or alternative device that is used in conjunction with a further embodiment or alternative method for producing the elastomeric member (depicted in FIGS. 14-17)
Figure 19:
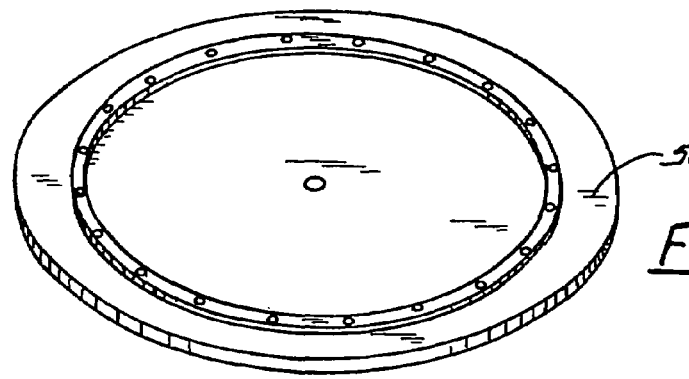
FIG. 19 is a perspective view of a plate disposable on the base of FIG. 18.

A solid cylindrical member 106B, preferably of glass, made in accordance with principles of the present invention, and having a seamless light-shaping diffuser surface integrally formed on the entire length and exterior circumferential surface thereof, is placed on a plate 500 which in turn is disposed atop a base 502 (FIGS. 18-20). The illustrated base 502 and plate 500 are each generally circular or disc-like in shape, and are dimensioned and configured to be concentric (FIG. 22) when assembled with cylindrical member 106B, as shown in FIG. 20.

The cylindrical mold portions 504, 506, which are dimensioned to encircle solid cylindrical member 106B, are then disposed on plate 500 and joined, as shown in FIG. 21. The axial length of the joined mold portions 504 and 506, and inner diameter when joined, are so dimensioned relative to the solid cylindrical member 106B, as to present a gap 508 between the joined mold portions 504, 506 and the cylindrical member 106B as shown in FIG. 22.

Next, the above-disclosed curable elastomeric liquid 400 (FIGS. 14 and 15) is poured into gap 508 and cured, as above described, to produce in gap 508, an alternative embodiment of the elongated hollow cylindrical elastomeric member that was described above. Preferably, the alternative embodiment (not shown) of the elongated hollow cylindrical elastomeric member (described above) is similarly invertible and also has a radial thickness of about 1/16 inches to about 1/8 inches. The above-described methods of making a one-piece hollow cylindrical invertable elastomeric master, as described hereinabove, shall now be summarized.

The method comprises a series of steps. The first step contemplates applying an effective amount of a curable liquid photosensitive medium to an external circumferential surface of a cylindrical member. The cylindrical member is preferably elongated, defining a longitudinal axis. The cylindrical member, moreover, is rotatable about its longitudinal axis.

An additional step contemplates rotating the cylindrical member about its longitudinal axis, with the curable liquid photosensitive medium thereon, for forming substantially along the length and exterior circumferential surface of the cylindrical member a substantially seamless layer of curable photosensitive medium of substantially uniform radial dimension.

Next, the layer of photosensitive medium is cured on the elongated cylindrical member.

A further step of the method includes next subjecting the cured layer of photosensitive medium (that has been applied to the cylindrical member), substantially along the length and exterior circumferential surface thereof, to a source of coherent light that has been passed through a mid-master diffuser and thereby having imparted to it speckle, and then rotating the cylindrical member about its longitudinal axis to expose the photosensitive medium substantially along the length and exterior circumferential surface thereof in an irregular manner in accordance with the particular speckle in the coherent light, wherein the exposed photosensitive medium is able to be developed.

Next, the exposed photosensitive medium is developed substantially along the length and exterior circumferential surface of the photosensitive medium on the cylindrical member, to fix the irregularly exposed areas of the photosensitive medium as physical microstructures in the medium.

The method further includes the step of applying, substantially along the length and exterior circumferential surface of the developed photosensitive material, an effective amount of a curable elastomeric liquid and thereafter curing the elastomeric liquid, to produce an elongated hollow cylindrical elastomeric member of predetermined radial dimension that is in intimate contact with the now developed microstructures in the photosensitive material, thereby producing in the elastomeric member a seamless light-shaping and diffusing surface where the elastomeric member is in intimate contact with the microstructures, wherein the hollow cylindrical elastomeric member is invertible.

The invertible hollow cylindrical elastomeric member is next separated from the developed photosensitive material having the speckle pattern recorded therein. The invertable hollow cylindrical elastomeric member integrally includes the seamless light-shaping diffuser surface substantially along the length and inner circumferential surface thereof.

A further step of the method includes inverting the hollow cylindrical elastomeric member, for presenting the seamless light-shaping diffuser surface substantially along the length and exterior circumferential surface of the hollow cylindrical elastomeric member, thereby producing a hollow cylindrical elastomeric master, which itself can be used to produce seamless diffusers, or more durable seamless masters, as desired.

The above-described hollow cylindrical elastomeric member (or sleeve) which thus has the integral light-shaping and light-diffusing surface on its circumferential surface is preferably made of a commercially-available silicone rubber.

As mentioned above, silicone rubber sleeve 402A preferably has integral light-shaping and light-diffusing surfaces that take the form of a plurality of elongated integral microstructures 404A (FIG. 23A) or 404B (FIG. 23B), that were preferably formed from the use of optical objective device 214 (FIGS. 7 and 8), specifically selected so as to include either the cylindrical lense-like elements (FIG. 23A) or the elliptical lense-like elements (FIG. 23B), as was described above in connection with the variable diffuser apparatus and methods (FIGS. 6-11) aspect of the invention.

Reference is next made to FIGS. 23-32, to describe a preferred method of producing a one-piece hollow cylindrical seamless metal master, which is another one of the aspects of the present invention. The following method will be described in reference to principles described herein. Briefly stated, the one-piece hollow cylindrical seamless metal master has an integral light-shaping and light-diffusing surface on an exterior circumferential surface portion thereof.

Hollow tube 600, preferably of commercially-available acrylic material and having an outer diameter of about 6 inches, has the inverted silicone rubber sleeve 402A, preferably of 1/8 inch radial thickness, mounted on the exterior circumferential surface (FIGS. 23 and 24) of hollow tube 600. The silicone rubber sleeve 402A has a seamless light-shaping diffuser surface integral with the entire length and exterior circumferential surface thereof.

Tube 600 and rubber sleeve 402A are relatively dimensioned, to be of substantially the same length. Moreover, the inner diameter of sleeve 402A is dimensioned, relative to the outer diameter of tube 600, such that the inner diameter of elastomeric sleeve 402A is under slight tension, with the result that the exterior circumferential surface of sleeve 402A, because it has been inverted after being formed (see, e.g., FIGS. 14-17), is under slightly greater tension, substantially along the entire exterior circumferential surface of tube 600, so that sleeve 402A does not move longitudinally relative to tube 600 when rotatably carried thereby.

The method to produce the mentioned one-piece hollow cylindrical seamless metal master contemplates next intimately contacting the exterior circumferential surface of the elastomeric material with an effective amount of a coating 602 of a first metal. Coating 602 is thus applied to the light-shaping diffuser surface of sleeve 402A, substantially along the length and exterior circumferential surface of sleeve 402A, to "convert" the elastomeric sleeve 402A, which is for the purpose of enabling a suitable hard metal to be applied thereto. A preferred "conversion" coating is silver. In addition to applying a silver coating as herein described, other suitable metal "conversion" coatings, well-known to those skilled in art, may be applied by other suitable methods, also known to those skilled in the art, such as vapor deposition.

The purpose of the "conversion" coating is for enabling a suitable hard metal subsequently to be applied to the light-shaping diffuser surface portion of silicone rubber sleeve 402A. Other suitable "conversion" metals may thus be applied onto the light-shaping diffuser of silicone rubber sleeve 402A, such as by vapor deposition or by plating, onto the "conversion" coating mentioned above.

The "conversion" coating layer 602 (depicted in FIG. 25) is preferably silver, and is radially dimensioned at the microscopic level, having a radial thickness of about 1 to about 40 Å and preferably having a radial thickness of 1 to 9 Å.

The first metal coating 602 thus has an exterior circumferential surface as well as an interior circumferential surface that is in intimate contact with the light-shaping diffuser surface that is on the exterior circumferential surface of the hollow cylindrical elastomeric material layer 402A. Moreover, the first metal coating 602 is in an amount and is radially dimensioned, relative to the exterior circumferential surface of the hollow cylindrical elastomeric material layer 402A, such that the light-shaping diffuser surface is substantially reproducibly transferred from the exterior circumferential surface of sleeve 402A to the "conversion" (first metal) coating 602.

The method to produce the above-mentioned one-piece hollow cylindrical seamless metal master, which is described above and that is used to make seamless diffusers for various (especially wide-screen) applications, further contemplates the step of intimately contacting the exterior circumferential surface of the "conversion" (i.e., first metal) coating with a layer 604 of a second metal that is preferably passivatable. The second metal layer 604 has an exterior circumferential surface as well as an interior circumferential surface that is in such intimate contact with the exterior circumferential surface of the first metal coating 602 such that the light-shaping diffuser surface is substantially reproducibly transferred radially from the exterior circumferential surface of the first metal coating (i.e., conversion coating 602) to the interior circumferential surface of the passivatable second middle layer 604, after the cylindrical element 600 and the hollow cylindrical elastomeric material layer 402A are separated from the second metal layer 604, as is show in FIGS. 27 and 28.

For illustrative purposes, the light-shaping diffuser surface 606 is shown along the entire length (FIG. 27) and inner circumferential surface (FIG. 28) of the metal layer 604. The light-shaping diffuser surface 606 (shown in FIGS. 27 and 28) is integral with the inner circumferential surface of exemplary passivatable metal layer 604.

The preferred method of applying a suitable hard metal onto the "conversion" coating 602 is by plating a suitable hard, passivatable metal. As was mentioned above, those skilled in the art may choose to employ other suitable techniques, such as vapor deposition, to apply a suitable hard metal coating onto a suitable "conversion" coating.

Figures 2, 30:
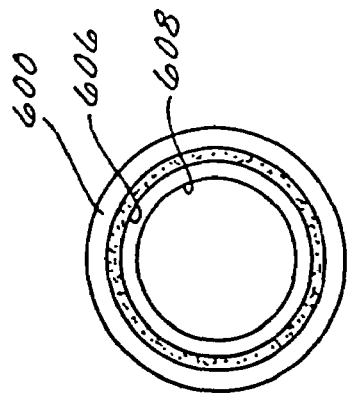
FIG. 30 is an end view of the thus-layered tubular composite shown in FIG. 29.
Figures 2, 29:
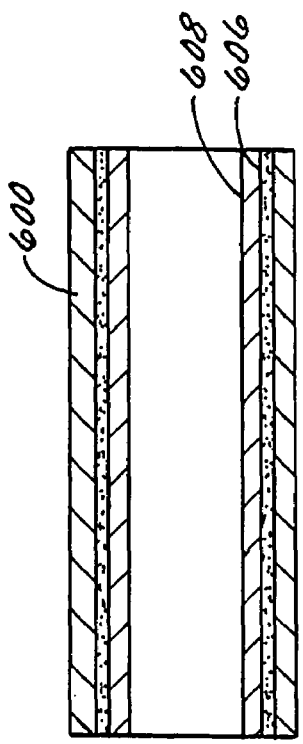
FIG. 29 is a side elevational view, in section, showing the thus-remaining tubular (i.e., hollow cylindrical) layer of FIGS. 27 and 28, and including an additional cylindrical layer, that is shown as being formed on the inner circumferential surface thereof.

The method to produce the mentioned one-piece hollow cylindrical seamless metal master next contemplates the step of passivating the interior circumferential light-shaping diffuser surface portion of the second metal layer, and then intimately contacting the now-passivated interior circumferential light-shaping diffuser surface portion of the second metal layer 604 with a layer 608 of a third metal, as is shown in FIGS. 29 and 30.

The third metal layer 608 is cylindrical and defines an interior circumferential surface and has an exterior light-shaping diffuser-contacting circumferential surface that is in such intimate contact with the interior circumferential surface of the second metal layer 604, whereupon the light-shaping diffuser surface is substantially reproducibly transferred radially from the interior circumferential surface of the second metal layer 604 to the exterior circumferential surface of the cylindrical third metal layer 608 after separation of the second metal layer 604 therefrom, as is shown in FIGS. 31 and 32, resulting in a hollow cylindrical metal shim 608 having the light-shaping diffuser surface 606 integrally formed seamlessly along the entire length (FIG. 31) and exterior circumferential surface (FIG. 32) thereof.

Moreover, as can be appreciated by those skilled in the art, the above-described method can be repeated to produce another embodiment of metal shim 608A having a length and inner diameter rotatably mountable onto commercially available equipment 610 for producing seamless diffusers of desired width and length, as is illustrated in FIG. 33.

To elucidate this particular aspect of the present invention, the above-described method for forming a one-piece cylindrical seamless metal master shall now be summarized.

The method contemplates the step of radially mounting onto an exterior circumferential surface portion of a cylindrical element 600 a unitary hollow cylindrical layer 402A of elastomeric material defining an exterior circumferential surface and having an integral light-shaping diffuser surface 606 (FIGS. 23 and 24) on the exterior circumferential surface thereof. The light-shaping diffuser surface defines a plurality of preselected speckle patterns 404A (FIG. 23A) or 404B (FIG. 23B) and their resultant, associated geometrical shapes (e.g., FIGS. 23A and 23B) having preselected transversely-disposed or longitudinally-disposed orientation and dimensions as well as preselected radial dimensions.

The present method further contemplates the step of intimately contacting the exterior circumferential surface of the unitary elastomeric material layer 402A with an effective amount of a "conversion" coating 602 of a first metal (FIGS. 25 and 26), wherein the first metal (i.e., "conversion") coating 602 defines an exterior circumferential surface and an interior circumferential surface that is in intimate contact with the exterior circumferential surface of the hollow cylindrical elastomeric material layer 402A, and wherein the first metal coating 602 is in an amount and is radially dimensioned, relative to the exterior circumferential surface of the hollow cylindrical elastomeric material layer 402A, such that the light-shaping diffuser surface is substantially reproducibly transferred from the exterior circumferential surface of the hollow cylindrical elastomeric material layer 402A, radially through the first metal coating 602, to the exterior circumferential surface of the first metal coating 602.

The method further contemplates including the step of intimately contacting the exterior circumferential surface of the first metal coating 602 with a layer 604 of a second metal, wherein the second metal is preferably passivatable, and wherein the second metal layer 604 defines an exterior circumferential surface and an interior circumferential surface that is in such intimate contact with the exterior circumferential surface of the first metal coating 602 that the light-shaping diffuser surface is substantially reproducibly transferred radially from the exterior circumferential surface of the first metal coating 602 to the interior circumferential surface of the passivatable second metal layer 604 after the cylindrical element 600 and the hollow cylindrical elastomeric material layer 402A (see, e.g., FIGS. 25 and 26) are separated from the second metal layer 604 (see, e.g., FIGS. 27 and 28).

The method thus contemplates, before passivating the second metal layer 604, the step of separating the cylindrical element 600 and the hollow cylindrical elastomeric material layer 402A from the second metal layer 604 (see, e.g., FIGS. 25 and 26), whereupon the light-shaping diffuser surface 606 is substantially reproducibly transferred radially from the exterior circumferential surface of the first metal coating 602 to the interior circumferential surface of the passivated second metal layer 604 (as is depicted in FIGS. 27 and 28).

The method further contemplates including the step of next passivating the interior circumferential light-shaping diffuser surface portion 606 of the second metal layer 604 and thereafter intimately contacting the interior circumferential light-shaping diffuser surface portion 606 of the second metal layer 604 with a layer 608 of a third metal, wherein the third metal layer 608 is cylindrical and defines an interior circumferential surface and an exterior circumferential surface that is in such intimate contact with the interior circumferential surface of the second metal layer 604 that the light-shaping diffuser surface 606 (see, e.g., FIGS. 29 and 30) is substantially reproducibly transferable radially from the interior circumferential surface of the second metal layer 604 to the exterior circumferential surface of the cylindrical third metal layer 608 after separation of the second metal layer 604 therefrom (see, e.g., FIGS. 31 and 32).

The method thus further includes the step of separating the passivated second metal layer 604 from the cylindrical third metal layer 608, whereupon the light-shaping diffuser surface 606 is substantially reproducibly transferred radially from the interior circumferential surface of the second metal layer 604 to the exterior circumferential surface of the cylindrical third metal layer. In the above-described, summarized method, the first metal coating 602 is preferably silver and the second metal layer 604 is preferably plated nickel. The illustrated plated nickel layer 604, moreover, is preferably longitudinally elongated, unitary, hollow and cylindrical, and has a radial thickness of about 0.005 inches to about 0.0010 inches. In the above-described, summarized method the third metal layer 608, preferably also plated nickel, is longitudinally-elongated, unitary, and has a radial thickness of about 0.0020 inches.

An alternative method, depicted in FIGS. 23-2, 24-2, 29-2 and 30-2, shall now be summarized. This method is directed to the steps for producing a metal (preferably nickel) cylindrical sleeve.

Figures 2, 24:
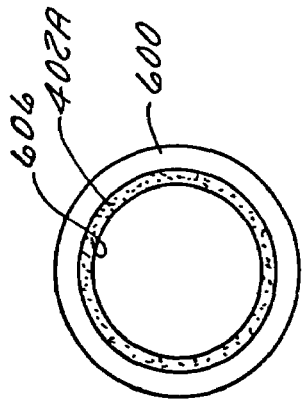
FIG. 24 is an end view of the elastomeric member/hollow cylindrical member assembly (shown in FIG. 23), wherein the hollow cylinder is shown as a tube having a length dimension (FIG. 23) and an outer diameter (FIG. 24), so related to the length and inner diameter of the elastomeric sleeve as to provide structural support for the light shaping diffuser surface pattern thereon.
Figures 2, 23:
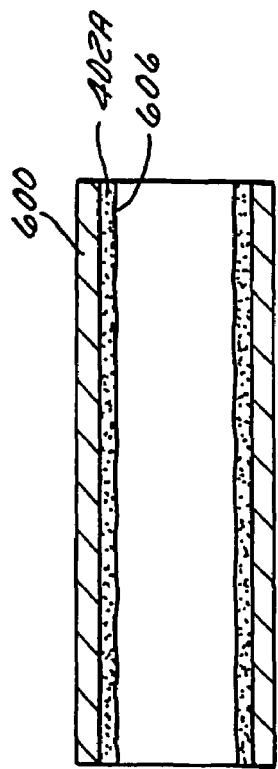
FIG. 23 is a side elevational view, in section, depicting a hollow cylindrical member and the elastomeric master (produced by the method illustrated in FIGS. 14-17), after curing and inversion, on the exterior circumferential surface of the hollow cylindrical member, whereupon the seamless light shaping diffuser surface-pattern is presented on the exterior circumferential surface of the illustrated elastomeric member/hollow cylindrical member assembly.

A silicone rubber sleeve 402A with the integral light-shaping diffuser surface 606 on the inner diameter is disposed longitudinally within hollow tube 600, as shown in FIGS. 23-2 and 24-2. The inner diameter of tube 600 is substantially the same dimension as the outer diameter of sleeve 402A, with the result that rubber sleeve 402A fits snugly within tube 600. The radial thickness of sleeve 402A is preferably 1/10 inch.

Next, a silver "conversion" coating is applied to the inner circumferential surface of sleeve 402A, onto and preferably completely covering the integral light-shaping diffuser surface 606.

After that a hard metal, preferably nickel, is plated onto the "conversion" coating. The radial thickness of the silver "conversion" coating is as described above. The radial thickness of the thus-plated nickel is also as stated above, and is most preferably about 5/1000 inch to about 7/1000 inch.

Finally, a third metal layer 608 is plated onto the nickel layer (mentioned above), as shown in FIGS. 29-2 and 30-2. Radial thickness of the third metal layer 608 is as described above. Also, subsequent steps to produce the nickel sleeve are as described above.

What has been illustrated and described herein is a cylindrical seamless metal master for producing seamless light-shaping diffuser sheets of desired length and width having uniform or variable diffusing characteristics along the length and/or width of the sheets. Also illustrated and described are several aspects of the seamless metal diffuser, including a method of making a one-piece hollow invertible rubber master and an apparatus and process for effecting variable diffuser recording in photosensitive medium such as conventional photoresist. While the present invention is described in the above text and accompanying drawing figures, it is not the intent of the inventors to limit the invention to the preferred embodiments contained herein. Indeed, after referring to this patent specification, those skilled in the art will conceive further embodiments of the present invention. For these reasons, the current inventors desire that their present invention be protected by all alternative embodiments and equivalents as is afforded by a broad interpretation of the appended claims.

We claim:

1. A one-piece cylindrical seamless master having:
   an integral seamless light-shaping diffuser surface on an exterior surface portion thereof, wherein the cylindrical master defines a longitudinal axis and is rotatable thereabout;
   wherein the surface of light-shaping diffuser has a plurality of microstructures projecting therefrom, said microstructures having irregular lengths in the projecting direction;
   wherein the seamless master is hollow, longitudinally-elongated and defines an interior circumferential surface;
   wherein the master, when rotated about its longitudinal axis, is used to produce a seamless light-shaping diffuser; and
   wherein the seamless master is made of a hard metal.

2. A one-piece cylindrical seamless master having:
   an integral seamless light-shaping diffuser surface on an exterior surface portion thereof, wherein the cylindrical master defines a longitudinal axis and is rotatable thereabout;
   wherein the surface of light-shaping diffuser has a plurality of microstructures projecting therefrom, said microstructures having irregular lengths in the projecting direction;
   wherein the seamless master is hollow, longitudinally-elongated and defines an interior circumferential surface;
   wherein the master, when rotated about its longitudinal axis, is used to produce a seamless light-shaping diffuser; and
   wherein the seamless master is made of plated nickel.

3. A one-piece cylindrical seamless master having:
   an integral seamless light-shaping diffuser surface on an exterior surface portion thereof, wherein the cylindrical master defines a longitudinal axis and is rotatable thereabout;
   wherein the surface of light-shaping diffuser has a plurality of microstructures projecting therefrom, said microstructures having irregular lengths in the projecting direction;
   wherein the seamless master is hollow, longitudinally-elongated and defines an interior circumferential surface;
   wherein the master, when rotated about its longitudinal axis, is used to produce a seamless light-shaping diffuser; and
   wherein the one-piece seamless master is hollow, longitudinally-elongated and defines an interior circumferential surface, wherein the longitudinally-elongated seamless master, when rotated about its longitudinal axis, is used to produce a seamless light-shaping diffuser, wherein the seamless master is made of a hard metal, and wherein the hard metal is plated nickel.

4. A one-piece cylindrical seamless master formed by a method, the method comprising the steps of:
  (1) radially mounting onto an exterior circumferential surface portion of a cylindrical element a unitary hollow cylindrical layer of elastomeric material defining an exterior circumferential surface and having an integral light-shaping diffuser surface on the exterior circumferential surface thereof, wherein the light-shaping diffuser surface defines preselected speckle patterns and resultant transversely disposed and longitudinally-disposed geometrical shapes having preselected radial dimensions and the surface of light-shaping diffuser has a plurality of microstructures projecting therefrom, said microstructures having irregular lengths in the projecting direction;
  (2) intimately contacting the exterior circumferential surface of the unitary elastomeric material layer with an effective amount of a coating of a first metal, wherein the first metal coating defines an exterior circumferential surface and an interior circumferential surface that is in intimate contact with the exterior circumferential surface of the hollow cylindrical elastomeric material layer, and wherein the first metal coating is in an amount and is radially dimensioned, relative to the exterior circumferential surface of the hollow cylindrical elastomeric material layer, such that the light-shaping diffuser surface is substantially reproducibly transferred from the exterior circumferential surface of the hollow cylindrical elastomeric material layer, to the exterior circumferential surface of the first metal coating;
  (3) intimately contacting the exterior circumferential surface of the first metal coating with a layer of a second metal, wherein the second metal is passivatable, wherein the second metal layer defines an exterior circumferential surface and an interior circumferential surface that is in such intimate contact with the exterior circumferential surface of the first metal coating that the light-shaping diffuser surface is substantially reproducibly transferred radially from the exterior circumferential surface of the first metal coating to the interior circumferential surface of the passivatable second metal layer;
  (4) separating the cylindrical element and the hollow cylindrical elastomeric material layer from the second metal layer, whereupon the light-shaping diffuser surface is substantially reproducibly transferred radially from the exterior circumferential surface of the first metal coating to the interior circumferential surface of the passivatable second metal layer;
  (5) passivating the interior circumferential light-shaping diffuser surface of the second metal layer;
  (6) intimately contacting the interior circumferential light-shaping diffuser surface of the second metal layer with a layer of a third metal, wherein the third metal layer is cylindrical and defines an interior circumferential surface and an exterior circumferential surface that is in such intimate contact with the interior circumferential light-shaping diffuser surface of the second metal layer that the lightshaping diffuser surface of the second metal layer is substantially reproducibly transferable radially to the exterior circumferential surface of the cylindrical third metal layer; and
  (7) separating the passivated second metal layer from the cylindrical third metal layer, whereupon the light-shaping diffuser surface of the second metal layer is substantially reproducibly transferred radially from the interior circumferential surface of the second metal layer to the exterior circumferential surface of the cylindrical third metal layer.

5. The seamless master of claim 4, wherein the first metal coating is silver.

6. The seamless master of claim 4, wherein the second metal layer is plated nickel.

7. The seamless master of claim 4, wherein the third metal layer is plated nickel.

* * * * *